United States Patent [19]
Berthier

[11] 3,765,916

[45] Oct. 16, 1973

[54] PROCESS FOR MAKING NONCORROSIVE CEMENT WITH CONTROLLED SETTING TIME

[76] Inventor: Rene-Marie Berthier, 4, rue Wilfried Killian, Grenoble, France

[22] Filed: Feb. 9, 1971

[21] Appl. No.: 114,092

Related U.S. Application Data

[63] Continuation-in-part of Ser. No. 748,638, July 30, 1968, abandoned.

[52] U.S. Cl. .................. 106/102, 106/97, 106/103
[51] Int. Cl. .......................... C04b 7/02, C04b 7/54
[58] Field of Search ...................... 106/89, 100, 102, 106/103, 315, 98

[56] References Cited
UNITED STATES PATENTS

| | | | |
|---|---|---|---|
| 263,873 | 9/1882 | De Smedt | 106/102 |
| 743,218 | 11/1903 | Bamber | 106/102 |
| 1,966,419 | 7/1934 | Pontoppidan | 106/102 |
| 1,976,132 | 10/1934 | Larmour et al. | 106/102 |
| 1,976,133 | 10/1934 | Larmour et al. | 106/102 |
| 2,085,044 | 6/1937 | Roller | 106/102 |

FOREIGN PATENTS OR APPLICATIONS

| | | | |
|---|---|---|---|
| 1,505,381 | 12/1967 | France | 106/102 |

*Primary Examiner*—James E. Poer
*Attorney*—Robert E. Burns and Emmanuel J. Lobato

[57] ABSTRACT

Finely divided water is added to finely powdered Portland cement during or after milling of the cement and while subjecting the cement to an active mixing action to bind the water intimately and uniformly with the cement particles. The amount of water intimately bound with the cement particles is at least several thousandths and not exceeding 10 thousandths of the mass of the cement. The water thus added retards and controls the setting of the cement when subsequently used in making concrete to provide a period of the order of one to three hours before the beginning of substantial hardening.

11 Claims, No Drawings

PROCESS FOR MAKING NONCORROSIVE CEMENT WITH CONTROLLED SETTING TIME

This application is a continuation-in-part of my copending application, Ser. No. 748,638, filed July 30, 1968, now abandoned.

The present invention has for its purpose the provision of a very simple means for controlling and slowing down the setting of hydraulic cements, the term "hydraulic cement" being herein used to designate a mineral cement composition which hardens after it has been mixed with water, such as cement used in making concrete of which Portland cement is the most common type.

When hydraulic cement is mixed with water to form a paste, this paste begins to harden or set only after a certain period of time. When the cement is used in making concrete it is desirable for the period of time prior to substantial setting to be sufficiently long to permit placing the concrete without being hampered by a decrease in plasticity.

The setting time for concrete, ie., the time between the mixing of the concrete and the beginning of substantial setting or hardening, is preferably of the order of one to three hours and can to some extent be varied by the composition of the cement, the fineness to which the cement is milled, the prevailing temperature etc. However, it sometimes happens for reasons that are difficult to determine that the setting time is irregular and may be much too short. This is referred to as "false set" or "quick set."

In an effort to avoid false set and to control and lengthen the setting time, it has been proposed to add various organic or inorganic substances to the cement as setting retardants and control means. Of these, the only substance that has come into practical use is calcium sulfate (gypsum). However, calcium sulfate can itself in certain cases cause false setting and rapid setting. Moreover, calcium sulfate is undesirable in the cement, as are in general all saline materials, because of the danger it presents of corroding steel reinforcement in the concrete and steel frames with which the concrete is used.

It is an object of the present invention to manufacture hydraulic cement and in particular Portland type cement having a controlled —and not too rapid— setting time without adding to the cement calcium sulfate or other corrosive materials. The cement made in accordance with the present invention has the advantage of providing a controlled and uniform setting time while being free of corrosive material so that it does not attack steel reinforcing rods or framework used with concrete made from the cement.

In accordance with the invention, the cement is milled to a fine powder and a predetermined amount of finely divided water is added to the cement while subjecting the cement to an active mixing action so that the water is rapidly and uniformly distributed in the milled cement powder and reacts with the cement so as to "fix" or bind the water intimately and uniformly with the particles of the cement powder.

The proportion of water to be fixed on the cement particles is of the order of only several thousandths of its mass and should not exceed 10 thousandths. Within these limits the amount of water can be varied as desired according to the composition of the cement and the setting time desired. With cement of the same fineness and same composition, the setting time is increased by increasing the amount of water added. However, if the quantity of water is greater than 10 thousandths, there ensues a loss of resistance after hardening which is too great to be acceptable. With Portland type cement, a proportion of the order of five thousandths of water is sufficient to obtain the desired retardation and control of setting.

The water must be perfectly and uniformly distributed along the entire surface of the cement particles in order to obtain the desired result. The period of distribution of water in the cement must be as short as possible, particularly at higher operating temperatures. In order to obtain uniform distribution of the water in a short period of time, it is important for the water to be added in finely divided form and for the cement powder to be subjected to active mixing action while the water is being added.

The water can be distributed in the cement powder at any time during or after milling the cement but in any event a substantial time before use of the cement. For example, finely divided water can be introduced in the cement mill in which the cement is being ground, preferably in one of the later stages, or the water may be combined with the cement in a suitable mixer after the milling of the cement powder has been completed.

Preferably after the water has been added the cement is stored in a closed container for at least a minimum time in order to afford additional time for reaction of the water with the cement. The storage time depends on the temperature at which the hydration treatment has been carried out. If water has been added to hot cement which comes out of the cement mill at a temperature near 100° C., the treated cement should be stored in a closed container until it has cooled to ambient temperature. This avoids the loss of water through evaporation. If the cement to be treated is cool and has been kept away from air, the water distribution process can be applied at any desired time but after treatment it should be maintained in a closed container for a minimum time before it is used. The extent of this time is of the order of half an hour to an hour. In addition to affording an opportunity for the water to react with the cement instead of being evaporated, storage of the treated cement powder in a closed container has the added advantage of protecting the treated cement from carbon dioxide in the air. This is desirable because the carbon dioxide has a reverse effect on the cement.

It will be seen that the treatment in accordance with the present invention is quite different from the slaking of lime or lime aluminates which is usual in making hydraulic lime or natural cement and which requires much greater quantities of water.

The water added to the cement in accordance with the present invention does not merely moisten the cement particles but reacts with the cement so as to become intimately bound or fixed to the cement particles. This is shown by the fact that the water is not driven off by heating the treated cement to a temperature of for example 200° C. as would be the case with superficial or absorbed but unreacted water. It is only when the cement is heated to a temperature of about 500° C. that the water is freed. Hence, the amount of "fixed" water can be determined by observing the weight loss when the cement is heated to a temperature above 500° C. The proportions of water referred to above are proportioned by weight and refer to the quantity of water which has reacted with the cement so as to be bound or fixed to the cement particles. Depending on the conditions under which the water is added, it may be necessary to use additional water in order to compensate for loss of water by evaporation in the process. The amount of water that it is necessary to add under given conditions can be readily determined by checking the amount of fixed water in the treated cement. The amount of water to be added then remains constant as long as the conditions are kept the same.

The setting time of cement prepared in accordance with the present invention can be determined by standard methods of measuring setting and false setting as set out for example in ASTM C-77-40 and ASTM C-187-64 64 and for false setting ASTM C-451-64 T. These standards are measures of stiffness of a standard mixture of cement and water and the elapsed time between the preparation of the paste and the appearance of stiffness. The setting is considered normal when the stiffness regularly appears about 1 to 3 hours, and preferably about two hours, after preparation of the paste. False setting, on the contrary, is very irregular and may occur after only several minutes. Within the limits indicated above, the setting time of cement prepared in accordance with the invention can be varied by varying the amount of water fixed on the cement during treatment. When other parameters remain the same the setting time is increased by increasing the proportion of water.

The technical means used for obtaining a very rapid and very uniform distribution of water in the milled cement powder is selected according to the equipment available. The water can be added either during or after the milling of the cement.

Cement is customarily ground to a fine powder in a tube mill or ball mill comprising a rotating cylinder higher at one end than the other and containing tubes or balls which tumble inside the cylinder as it rotates and thereby pulverize the cement. The cement in the form of clinker or partially ground cement is introduced into the upper end of the cylinder and the finely ground cement is discharged from the lower end. The cylinder is customarily divided into a plurality of chambers or compartments which retain the balls or other grinding elements and allow the milled cement to discharge from one chamber to the next.

In accordance with the invention, water can be added to the cement during milling by introducing water at the input end and also at the output end of the mill. The water is introduced in such manner as to be uniformly distributed throughout the cement. For example, it is introduced by a fine spray or atomizer. Water introduced at the input of the mill has a longer time to react with the cement but a part of the water is lost by vaporization particularly since cement mills are ordinarily ventilated. Water introduced into the last chamber of the grinder is less subject to dissipation by evaporation but has a shorter time to be mixed with and react with the cement before the cement is discharged from the mill. Because of the loss of water through evaporation, it is necessary to introduce more water into the mill than is to be reacted with the cement. The amount of water fixed to the cement particles is readily determined by heating the cement to a temperature of about 500° C. or above and observing the loss of weight. The amount of water introduced into the mill is accordingly adjusted to obtain the desired proportion of water in the finished cement. Once the correct amount of water to be added has been ascertained, no further adjustment is required since the cement mill is uniform in its operation.

The loss of water in the mill would be greatly reduced by using a non-ventilated grinder but modern high production grinders are always ventilated. For this reason it is preferable to add the water by a separate mixing operation after the cement has been ground.

There exist industrial mixers for finely ground products which are generally suitable for use in carrying out the process of the present invention.

Industrial mixers may be divided into two general categories according to whether the mixing vessel or tank is stationary or is rotating. A mixer of the first category has a stationary semicylindrical horizontal tank in which the powder is mixed and is propelled from one end of the tank to the other by helical blades fixed on a rotating shaft which is coaxial with the cylindrical part of the tank. Water is introduced in the tank by atomizers or sprays located above the level of the powder.

Rotating tank apparatus is similar to a tube mill except that it has neither balls or separate compartments but rather a plurality of blades riveted onto the inside of the walls to drive the powder and cause it to fall. Such apparatus somewhat resembles rotating drum concrete mixers. Such mixers are used in the chemical industry to mix various dry powders but have not heretofore been used in cement factories. Water is introduced as a fine spray or mist, for example through the axles of the drum.

The addition of water to the cement can be carried out at any temperature between 20° and 100° C. At a higher temperature the water reacts more quickly with the cement while a lower temperature has the advantage of avoiding loss by evaporation. The process can conveniently be carried out at ambient temperature with only such increase in temperature as may result from the mechanical energy of the mixer and reaction of the water with the cement.

In developing the present invention, first trials were carried out with a rotating drum machine of the kind which is normally used to carry out abrasion tests of aggregates for concrete according to the American Standard ASTM C 131 and known as a "Los Angeles Machine" with an inner diameter of 28 inches. In these trials, a charge of finely ground cement corresponding to one quarter of the volume of the interior of the drum was placed in the mixer, the orifices were closed and atomization of water in the drum was carried out by means of hollow axles supporting the drum. Small successive quantities of water were added. In these conditions, all of the water injected was incorporated into the cement powder in a perfectly regular manner. A production model rotating tank mixer operates in the same manner but is of larger size. A mixer used in carrying out the process of the present invention can operate continuously or in batches.

A convenient and efficient means of adding water to the cement powder is to first mix the required quantity of water with a fine, preferably nonporous sand which is then mixed with the cement with a suitable mixing device as mentioned above. For example, if it is desired to incorporate five thousandths of water, there will be added to the cement 10 percent of fine sand humidified with five hundredths of water which is a content with which the sand is sufficiently mobile to be rapidly mixed. The sand thus constitutes a vehicle for the water to be incorporated in the cement. Other finely powdered inert mineral materials such as milled cinders, pouzzolanic silica or flying ashes from thermal installations can be used in place of the fine sand. Instead of supplying water in a finely atomized condition, it may also be supplied in a vapor state as steam.

The proportion of water that is fixed on the cement according to the process of the invention is very intimately bound with the cement and the cement thus treated can be shipped and stored like normal cement and undergo the usual climatic temperatures during shipping and storage. The amount of water later necessary to form concrete with the cement thus treated is somewhat less than with non-treated cement.

The effectiveness of the process in accordance with the present invention is illustrated by the following examples which were carried out with cement having the following analysis:

|  | Portland cement No. 1 | Portland cement No. 2 |
|---|---|---|
| $SiO_2$ | 21.3 | 21.5 |
| $Al_2O_3$ | 4.0 | 5.5 |
| $Fe_2O_3$ | 3.0 | 2.0 |
| $TiO_2$ | 0 | 0.3 |
| $CaO$ | 67.8 | 65.7 |
| $MgO$ | 0.4 | 1.0 |
| $Na_2O + K_2O$ | 0.2 | 0.2 |
| $SO_3$ | 2.7 | 3.2 |
| Other | 0.6 | 0.6 |
|  | 100.0 | 100.0 |

EXAMPLE 1:

Normally manufactured Portland Cement No. 1 of the analysis given in the foregoing table but with the usual addition of 6 percent gypsum in the mill ($SO_3$ = 2.7 percent) was mixed with water to form a paste with a W/C ratio (water/cement) of 0.45. The viscosity after mixing was 14 seconds corresponding to a viscosity of 60 centi-stokes. Viscosity after 1 hour was 15 seconds. The start of stiffness occurred after 2 hours and 50 minutes.

EXAMPLE 2:

The same cement as used in Example 1 was milled without gypsum or humidification. The viscosity of a paste having a W/C ratio of 0.45 increased very quickly and in an irregular manner from one sample to the next and the paste was not usable as a grout. The rigidity started after a time period ranging from 0 to 10 minutes.

EXAMPLE 3:

The same cement as in Example 1 was milled without gypsum but with the addition of water during milling in accordance with the present invention. Water was introduced at the inlet of the mill at the rate of 60 liters per hour and at the outlet (in the last compartment of the mill) at a rate of 150 per hour for a production of 8,500 kg of cement per hour. Fixed water measured as the loss of weight at 500° C. was 0.71 percent or about 1/5th of the injected water (three percent). Using a paste with a W/C ratio of 0.45, the viscosity was 13 seconds at the start and increase slowly to attain 25 seconds after three hours and then more rapidly as the paste began to set as determined by a standard auger device.

The cement was next stored in a metal silo and was delivered several days later at a temperature of 50° C. whereupon new tests were made with practically identical results.

EXAMPLE 4:

The same cement was milled under the same conditions as in Example 3 except that 120 liters of water per hour was added at the inlet and 180 liters of water per hour was added at the outlet with an outlet temperature slightly higher than 100° C. The fixed water was found to be 0.48 percent. The viscosity of a paste prepared in the same manner as in Exhibit 3, had a viscosity of 16 seconds at the beginning and 21 seconds after a delay of 3 hours.

EXAMPLE 5:

A test was made in the same installation with another clinker from another furnace in the same cement works. This cement No. 2 (see above analysis table) differs from the previous one by a higher percentage of alumina. This would usually be corrected for by using a higher addition of gypsum ($SO_3$ = 3.2 percent) but in accordance with the present invention the gypsum was omitted. With the same conditions of control as in Example 3, the fixed water was found to be 0.82%, viscosity at the beginning 17 seconds and viscosity after 3 hours, 25 seconds.

EXAMPLE 6:

The same cement was used as for Example 5, but with the conditions of Example 4. The fixed water was found to be 0.69 percent, viscosity at the beginning 17 seconds and viscosity after 3 hours, 25 seconds.

The slightly higher viscosity in Examples 5 and 6 (with Portland Cement No. 2) signifies that it is better to utilize Portland Cement which is not too rich in alumina. In Examples 5 and 6 the proportion of fixed water was likewise higher which suggests that the aluminates of anhydrous cement are those which are hydrated by the process of the invention. However, with a cement richer in alumina, the control of the quantity of added water must be more exact.

The process of treatment according to the invention is particularly useful for controlling the setting of cement instead of the material currently used such as gypsum in that it avoids the corrosive action of the gypsum or other salts on steel reinforcing of framework used with concrete made from the cement. Moreover, the cost of the treatment is negligible since the only material added is water.

The principle of the invention is technologically new and unexpected but a hypothetical explanation can be given. The setting of the cement like all solid-liquid or solid-vapor reactions begins on superficial sites which are very sensitive and are called "germs." Upon contact with water, the hydration reaction becomes localized on the germs and then spreads so tha it eventually reaches the entire surface of the powder particles and penetrates into the particles. The process according to the invention consists in neutralizing or inhibiting these "germs" by bringing a few thousandths in weight of water which becomes fixed directly on the water-seeking germs without reaching the mass of the cement. It is thus that there is obtained a cement with a regular set which can be slowed down without the incorporation of corrosive saline substances.

The water which is disbursed in the cement according to the present invention can also serve as a vehicle for small dosages of dyes or other materials which can thus be incorporated in the cement in advance instead of being added when the concrete is made.

I claim:

1. A process of producing hydraulic cement of the Portland cement type free of corrosive constituents including gypsum which comprises milling said cement free of corrosive constituents to a fine powder and thereafter rapidly and uniformly distributing in the milled cement powder, after the milling of said cement has been completed, finely divided water in an amount selected to retard and control the setting of the cement, when subsequently used in making concrete, to provide a period of at least one to three hours before substantial setting of the concrete, said water being added in the form of free water in liquid state in the form of fine droplets while subjecting said cement to an active mixing action to distribute said water perfectly and uniformly over all the surface of the particles of cement and to react with the cement to bind said water intimately and uniformly with said cement particles, the amount of water intimately bound with said cement particles being at least several thousandths of the mass of said cement and not exceeding ten thousandths of said mass.

2. A process according to claim 1, in which the amount of water intimately bound with said cement particles is of the order of five thousandths parts by weight of said cement.

3. A process according to claim 1, in which said water is distributed in said cement while said cement is at a temperature not lower than ambient temperature and not exceeding 100°C.

4. A process according to claim 3, in which said cement is confined in a closed receptacle after addition of said water until said cement is cooled to ambient temperature.

5. A process according to claim 1, in which after the addition of said water, said cement is confined in a closed receptacle for at least one half hour.

6. A process according to claim 1, in which said water is added to the milled cement while said cement is subjected to active mixing action in a mixer.

7. A process according to claim 1, in which said water is added to said cement in the form of a fine spray.

8. A process according to claim 1, in which the cement used contains less than five percent of alumina.

9. In a process of producing hydraulic cement of the Portland cement type free of corrosive constituents including gypsum which comprises milling said cement free of corrosive constituents to a fine powder and thereafter rapidly and uniformly distributing in and mixing with the milled cement powder an inorganic nonporous particulate material carrying free water coating the surface of its particles in an amount selected to retard and control the setting of the cement, when subsequently used in making concrete, to provide a period of at least one to three hours before substantial setting of the concrete, said water coated particulate material being added to said cement while subjecting said cement to an active mixing action to distribute the water carried by said particulate material perfectly and uniformly over all the surface of the grains of cement and to react with the cement to bind said water intimately and uniformly with said cement particles, said particulate material remaining mixed with said cement and the amount of water intimately bound with said cement grains being at least several thousandths of the mass of said cement and not exceeding ten thousandths of said mass.

10. A process according to claim 9, in which said inert inorganic particulate material is sand and in which said water is added to said sand in an amount of the order of one five hundredth part by weight of said sand.

11. A process according to claim 10, in which the amount of said sand added to and mixed with said cement is approximately ten percent of said cement by weight.

* * * * *